Oct. 18, 1960 A. L. PARRACK 2,957,167

METHOD AND APPARATUS FOR SPEED VARIATION COMPENSATION IN A RECORDING SYSTEM

Filed Jan. 8, 1958

2,957,167
Patented Oct. 18, 1960

2,957,167

METHOD AND APPARATUS FOR SPEED VARIATION COMPENSATION IN A RECORDING SYSTEM

Alvin L. Parrack, Bellaire, Tex., assignor to Texaco Inc., a corporation of Delaware Filed Jan. 8, 1958, Ser. No. 707,699
9 Claims. (Cl. 340—174.1)

Figure 1:
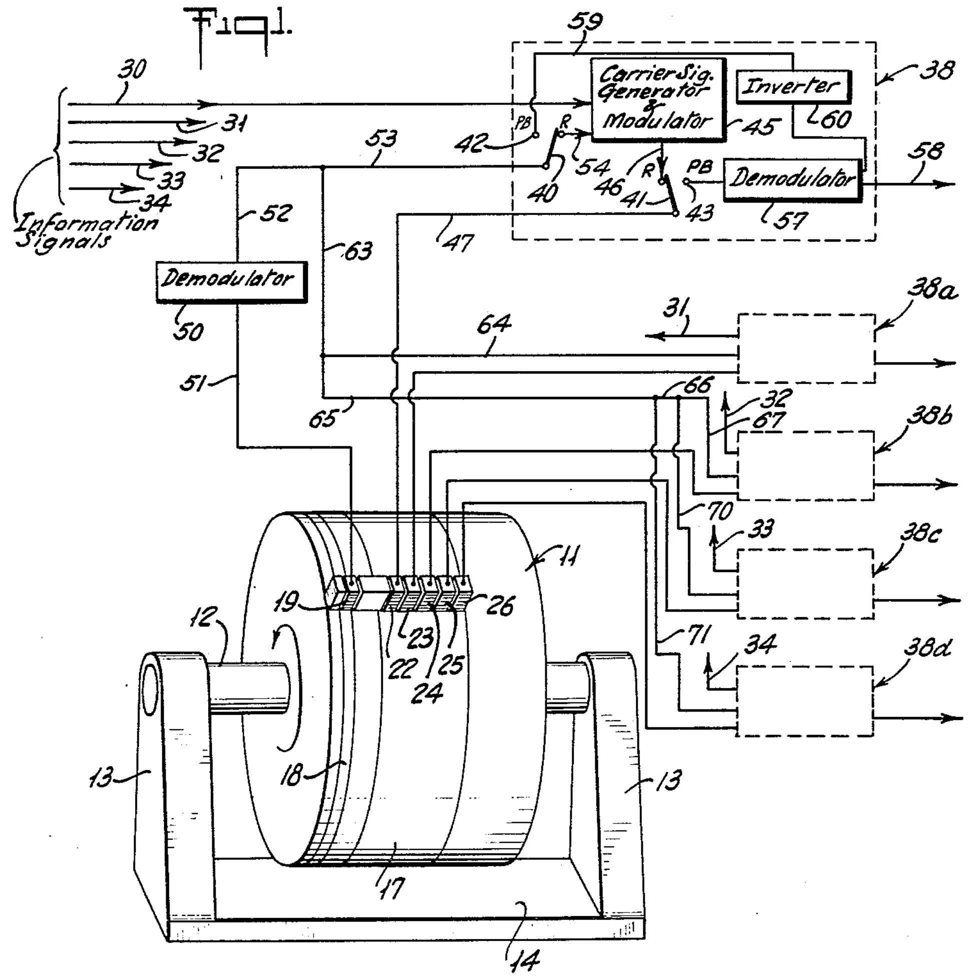

This invention is generally concerned with a method and apparatus for use in recording systems. More specifically, the invention deals with recording systems which employ a carrier signal that is frequency modulated. A more specific application of the invention deals with magnetic recording systems employing frequency modulation, and used in seismic prospecting.

In recording systems, where a relatively high frequency carrier with frequency modulation is employed; the speed of travel of the record medium is a major consideration from the standpoint of maintaining the speed constant during the recording and/or playback. This is particularly true for frequency modulation systems as compared with amplitude modulation, for the reason that any changes in the speed of the record medium will cause a change in the physical spacing along the record track of the individual cycles of the carrier signal as it is being recorded. In other words the speed of the record medium determines the physical spacing between adjacent bits of signal information. So that, whereas the modulation of a carrier signal, changes the frequency of the carrier; any changes in speed of the record medium will introduce additional effective changes in the frequency of the carrier as it is laid down on the record medium.

There have been many proposals heretofore made for correcting for speed variations in order to maintain constant speed. These proposals have included numerous arrangements where control is applied to the speed of the driving motor, in an attempt to counteract and overcome speed changes. These arrangements have not been very satisfactory for the reason that the inertia involved in the various mechanical elements introduces delays, and prevents some speed change corrections from taking place.

There is at least one known prior arrangement that applies a reference constant-frequency signal to a separate track on the record being made, and then cancels out change of speed signals during playback by employing an electronic signal cancelling arrangement. In such arrangement, however, there is a definite drawback that renders it inferior at best (if it is operative at all) for use with seismic recording operations. This is because, the use of recording in seismic operations often involves adjusting the playback heads for a plurality of channels, at different relative locations with respect to time. This is done in order to effect adjustments for making necessary corrections between adjacent traces of a record. Such relative position adjustments of the pickup heads renders the relationship between each pickup head and a reference track, no longer valid.

Consequently, it is an object of this invention to provide a method for conpensating speed changes during recording, wherein frequency modulation of a carrier signal is employed.

Another object of the invention is to provide a method of compensating for speed changes of the record medium, (where a relatively high frequency carrier signal is recorded) by directly varying the carrier frequency in accordance with the speed of the record medium. In this way, the physical laydown of the carrier signal data is effectively corrected in accordance with the speed of the record medium so that the resulting record contains the information just as if the speed had remained constant.

Another object of the invention is to provide a system for compensating so as to effectively eliminate the effects of speed change of a record medium, in frequency modulation recording. Such system employs the control of the frequency of the carrier signal employed, directly in accordance with the speed of the record medium, such that the signals are recorded as if no speed changes had existed.

Briefly, this invention concerns a method that may be used in a recording system wherein a carrier signal is frequency modulated in accordance with information to be recorded on a record medium. This method is one for compensating for variations in speed of the record medium, and it comprises pre-setting a plurality of means for generating signal bits equally spaced apart from beginning to end, and fixed relative to said record medium. The method also comprises driving said record medium past a recording element while in record making relation therewith, and comprises applying said carrier signal to said recording element. The method further comprises applying a detector or pickup head to said means for generating signal bits, while maintaining the detector or pickup head in a fixed position relative to said recording element. The method also comprises demodulating the output from said detector or pickup head to obtain a signal proportional to the speed of said record medium past said recording element, and modulating said carrier signal in accordance with said demodulated detector signal in order to vary the frequency of said carrier in proportion to the speed of said record medium, so that the carrier signal will be recorded with a constant spacing between successive cycles thereof.

The invention may also be briefly described as a system that is useful in a recording and reproducing system with a plurality of information channels, wherein said information channels may be shifted in time relative to one another upon reproduction thereof, and wherein said information channels each employs frequency modulation of a carrier signal. The system includes means for compensating for any change in speed of the record medium during the recording, which comprises a plurality of equally spaced means fixed relative to said record medium for generating signal bits in conjunction with a signal generating pickup. The compensating means also comprises a plurality of recording heads (one for each of said information channels) and means for translating said record medium relative to said recording heads and said pickup, in order to record the information on said channels over a predetermined length of record. The compensating means additionally comprises means for demodulating the output of said signal generating pickup, and means for modulating said carrier signal in accordance with the demodulated output of said pickup. All of the foregoing elements cooperate together so that said carrier signal is varied in frequency in proportion to the change in speed of said translating means so that the changes in frequency of said carrier which would have existed on the record are compensated for and removed as the record is made.

Figure 2:
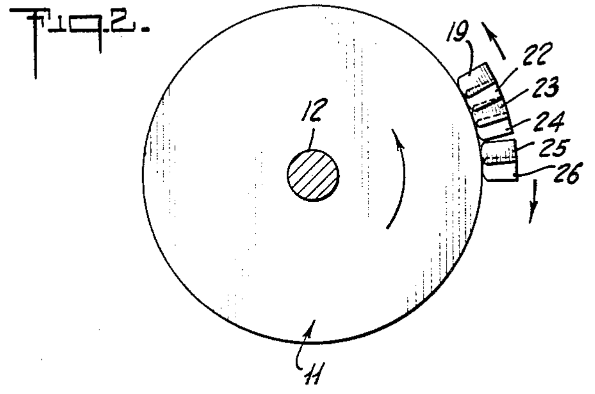

The foregoing and other objects and benefits of the invention will be more fully set forth in connection with the detailed description which follows, and which is illustrated in the drawings in which:

Fig. 1 is a schematic illustration showing a system according to the invention, that employs a drum support for a tape record; and Fig. 2 is an end view of the record drum, indicating an arbitrary set of positions of the plurality of pickup heads, as they may be shifted for various playback operations.

It will be apparent to anyone skilled in the art that this invention is applicable to recording equipment generally, so long as a relatively high frequency carrier signal is recorded on the record medium and the lower frequency intelligence signals are impressed by varying the frequency of the carrier (frequency modulation). Thus many different forms of recording may be applicable. For example, marks occurring on a paper tape could be used; phonographic-type grooves on the surface of a record could be used; variations in opacity in a light transmitting strip could be used; etc. However, in the example used to illustrate the invention, a magnetic tape is used. Furthermore, the signals impressed on the tape are in the form of magnetized spots having one of two polarities but being maximum strength so that the tape is magnetically saturated. In this manner, whenever signals are impressed on the tape, any previous magnetization is erased automatically. The intelligence is recorded in the form of the frequency of occurrence of these magnetized spots of alternate polarities (frequency modulation).

It will also be observed that the example employed to illustrate the invention is one for recording and transcribing seismic data. In this field, the useful information is in the nature of seismic waves having frequencies in the range of about twenty to two hundred cycles per second, and a carrier signal is employed which has an unmodulated frequency of four thousand, five hundred cycles per second.

Referring to Fig. 1, it will be observed that there is illustrated a drum 11 that is supported by a shaft 12, which in turn is carried by a pair of support brackets 13 which rest on, and are securely fastened to, a frame or base 14. The details of construction of the drum 11 and accompanying elements are not illustrated since they may take various forms without affecting the principles of the invention. However, for the purposes of explanation, it is contemplated that the drum 11 is being driven in rotation during recording and playback, by any convenient means (not shown). The drum 11 is employed merely as a supporting structure for a magnetic tape 17, that is wrapped around the periphery of the drum, and may be fastened for rotation with the drum in any convenient manner (not shown), e.g. there may be a slit in the surface of drum 11 into which the ends of the tape 17 may extend to be clipped for applying tension to the tape.

There is a separate track 18 on the drum 11 extending around the periphery thereof. As will be more fully pointed out below, this track 18 is illustrated to represent a separate narrow magnetic tape, similar to the tape 17. However, the track (or tape) 18 is made up with preloaded magnetic signal bits which are equally spaced apart over the entire length of track 18. Such signal generating bits may take the form of accurately premagnetized spots equally spaced apart along the track 18.

It is pointed out that the track 18 may take many widely different forms, e.g., it might consist of a gear structure having the teeth thereof with their outer surface extending flush with the circumferential surface of the drum 11. Such gear teeth would be constructed of paramagnetic material so that signals would be generated in a magnetic signal pickup head 19 that is situated over the track 18, adjacent to the peripheral surface of the drum 11. In this manner the teeth would be equally spaced apart and the frequency of the signals generated in the pickup head 19 would be directly dependent upon the speed of rotation of the drum 11.

It will be observed that the use of the term detector in the specification and claims is intended to mean any device that will act cooperatively with whatever kind of signal bit generating means has been employed. The result being to generate signals in such detector at a frequency that is directly dependent upon the speed of travel of the record medium. An example of such a detector is illustrated as the pickup head 19, described above.

If the track 18 employs a magnetic tape arrangement as indicated above, it will be preloaded with magnetized spots having alternately opposite polarity that are equally spaced apart over the entire length of the track 18. Thus, as with the gear tooth alternative, the pickup 19 will have generated therein a signal whenever the drum 11 is rotated. This signal will have a frequency that is directly dependent upon the speed of rotation of the drum 11.

Located over parallel tracks, or information channels on the magnetic tape 17, there is a plurality of transducers 22—26. These transducers may take the form of any feasible type of read-write head that may be employed in a magnetic-tape recording system. Furthermore, it will be understood that although there are only five transducers illustrated, for simplicity, the usual seismic recording equipment employed today makes use of twelve or even as many as twenty-four, information channels with a transducer in connection with each.

Referring to Fig. 2, it will be observed that pickup head 19 is illustrated in one circumferential position relative to the drum 11 while transducers 22 through 26 are illustrated occupying different circumferential positions around the surface of the drum 11. The reason for adjusting the circumferential positions of transducers 22—26 relative to the pickup head 19 concerns seismic operations and will be more fully explained below. At this point, it is merely pointed out that the adjustability of the positions of transducers 22—26, is dependent upon the requirements of how much relative time differences may be necessary in creating a record when playing back the recorded data. Thus in seismic work these corrections may be made for differences in weathering layer velocities at the geophones which are the sources for the various information channels.

No structure is illustrated for supporting the transducers, and pickup head, relative to the structure involved, for the reason that the showing is quite schematic and none of the mechanical details are in any way relevant per se with respect to this invention.

The illustrated system includes input data in the form of a plurality of separate signal channels 30—34. The signals in these channels are produced in the first instance by means of a group of geophones (not shown) for generating signals in accordance with seismic energy as it is received at the surface of the earth. Such input signals are introduced on the plurality of signal input circuits 30—34 that have a collective caption "information signals" applied thereto.

In order to avoid duplication and to improve clarity, only one complete circuit for the signals as received at each of the individual inputs 30—34 is illustrated. The duplicated elements that are included in this complete circuit include a group of elements 38 which are shown enclosed in a dashed line box. These same elements are duplicated in each of the other information channels as indicated by the dashed line boxes *38a* through *38d*.

The elements within each box 38 include a switch 40 and a switch 41 that each may be shifted between a record position, i.e. as illustrated, or a playback position that is indicated by the letters PB adjacent to a terminal 42 and 43 respectively for the two switches 40 and 41.

When the switches 40 and 41 are positioned for recording, the incoming information signals over circuit 30 are introduced to a carrier signal generator and modulator 45 where the carrier signal is modulated both in accordance with the signals being received over input circuit 30 and in accordance with the signals from pickup 19 after demodulation. The output signals from modulator 45 are carried over a circuit path 46 to the switch 41, and then via a circuit path 47 to the transducer 22. Thus, the signal output from modulator 45 will be recorded on a channel of magnetic tape 17 that corresponds with the location of transducer 22.

If the carrier signal were not modulated but should remain at a predetermined frequency, it would be recorded on the magnetic tape 17 with variations in the physically recorded signal frequency due to any speed changes in linear travel of the tape 17 past transducer 22 that are in turn due to speed changes in rotation of the drum 11. However as the drum 11 rotates, pickup head 19 generates signals in conjunction with the track 18, which signals will have a frequency directly dependent upon the speed of the drum 11. Now, there is a demodulator 50 that is connected to the pickup head 19 by a circuit path 51, and also connected at the output thereof via a circuit connection that includes a path 52 and 53 to the switch 40, and from there, there is a circuit path 54 which leads to an input of the modulator 45. Consequently, the carrier signal is modulated in accordance with the output from demodulator 50 in order to change the frequency of the carrier directly in proportion to the speed of tape 17 relative to transducer 22. For this reason, the physically recorded signal frequency of the carrier will be held constant since the spacing between successive cycles thereof will not change, as it would have were the carrier frequency to have been unmodulated (remained constant).

When the record that has been made on magnetic tape 17 is to be played back, switches 40 and 41 will be shifted to the opposite terminal 42 and 43 in each case, and the output signals from transducer 22 will be carried via circuit path 47 and switch 41 to a demodulator 57. The output of demodulator 57 then goes via a circuit path 58 to any desired indicator, or the like, (not shown) for displaying or otherwise making use of the information that is being read out from the tape 17. At the same time, the signals that are generated in pickup head 19 are carried to the demodulator 50 and then via paths 52 and 53 to the switch 40, where they are now transferred to a circuit path 59 that leads to the input of an inverter 60. The inverter 60 may take various forms and is merely employed for reversing the phase of the signals that are obtained from demodulator 50, so that they may be combined with the output signals from demodulator 57 in a cancelling manner to eliminate the effects of any speed changes taking place in the drum 11 during playback operation thereof.

It will be clear that each of the group of elements 38 are duplicated in the additional information channels, as already indicated by the schematic showing of dashed line boxes **38*a*, 38*b*, 38*c* and 38*d*. It is to be noted also, that the output from demodulator 50 is carried in common (or in parallel) to each of the channels via the illustrated circuits, which include a circuit path 63 and a path 64 for the channel that is connected to transducer 23. Similarly circuit paths 65, 66 and 67 carry the output of demodulator 50 to the elements of box 38*b* that is employed in conjunction with transducer 24. In like manner, there are additional circuit paths 70 and 71 for the channels employing transducers 25 and 26** respectively.

It is pointed out that this invention is generally applicable to various recording systems, but it is particularly of benefit in connection with seismic recording operations as has been already indicated above. While various types of recording equipment are available in connection with seismic recording work in general, it is contemplated that the invention is most applicable to magnetic tape types of recording equipment.

The details of the recording equipment (including electrical circuits involved) form no part, per se, of this invention. However, an illustration of one type of equipment which might be employed in the system that has been described above and illustrated in the drawings is the magnetic recording system described in an article by S. J. Begun, in Electronics magazine January 1955.

Such system (described in the article entitled "Magnetic Tape Improves Geophysical Recordings" by S. J. Begun, published in Electronics the January 1955 issue, at page 152 et seq.) is one that employs a frequency modulated carrier signal that is obtained from a multivibrator. In this manner, the recorded signals take the form of magnetized spots along each record track, that are completely magnetized by driving the magnetic material of the tape to saturation, alternately in opposite polarity. By employing this arrangement which uses frequency modulation to supply the information, the fidelity of the signals reproduced is extremely high. Also when writing the information onto the tape, any prior magnetization that existed is completely erased in favor of the new signal that is being impressed.

Of course demodulator 50 and inverter 60, as well as the overall circuit arrangement of the system according to this invention; are not to be found in the article referred to (by S. J. Begun). However, it will be clear to anyone skilled in the art that the details of demodulator 50 and inverter 60 may take any feasible form, so that no particular circuit for these elements need be illustrated herein.

*Operation*

The operation of a particular system according to this invention will be described in connection with Figs. 1 and 2. This description is confined to a single channel of the plurality of information channels involved; and, it will be understood that the same explanation applies similarly to each one of the other of the plurality of channels.

Beginning with a recording operation, it will be observed that as the information to be recorded is being received over the input circuit path 30, the drum 11 and magnetic tape 17 are being rotated for one complete revolution. During this revolution, the carrier signal (that is generated at generator 45) is being applied to the transducer 22 over the illustrated circuit including circuit connection paths 46 and 47, as well as switch 41. Simultaneously, the magnetic pickup head 19 is producing an output signal. This signal is being generated therein by the equally spaced signal bits that were previously set onto the track 18 in an accurate manner such that they are spaced equally apart from one another, over substantially the entire length of the track 18. It will be noted that this signal output from pickup 19 will therefore have a frequency that is directly proportional to the speed of the rotating drum 11, and the speed of the tape 17 relative to transducers 22—26.

The relatively high frequency signal generated in pickup 19 is carried over circuit path 51 from the pickup 19 to the demodulator 50. This signal then is demodulated by demodulator 50, resulting in an integral signal which varies directly in proportion to the speed of the drum 11. This integral signal is then carried from the output of demodulator 50 over the illustrated circuit (which includes circuit paths 52, 53, 54 and switch 40) to an input of the modulator for carrier signal generator 45. Here the integral signal is applied so as to modulate the carrier signal frequency directly in accordance with the speed of drum 11.

Consequently, assuming that there is no information input signal on circuit 30, so that the carrier signal generator is producing a given constant frequency prior to any modulation thereof, the carrier signal is being modulated so as to vary its frequency in accordance with the output signals from demodulator 50. Thus, the frequency of the output signal from modulator 45 will vary directly in proportion to the speed of drum 11. For this reason, the signal that is physically recorded on the tape 17 along a track corresponding with the position of transducer 22, will be impressed upon the tape 17 as if the speed had not varied.

In view of the foregoing explanation including the operation of the system, it will be clear that the following method may be carried out using the apparatus specifically described, as well as many other and different elements and apparatuses that are not mere equivalents of those illustrated.

The method is applicable to recording systems that employ frequency modulation of a carrier signal that is recorded on some record medium. It is concerned with compensating for variations in speed of the record medium. The steps employed include the following:

(1) Means for generating signal bits, will be set up along the track 18 in any feasible manner such that each of the signal bits are equally spaced apart physically along the length of the track 18, from one end thereof to the other (i.e. substantially all the way around the periphery of drum 11).

(2) The magnetic tape 17 is driven past the recording elements (transducers 22—26) while they are in operative record-making relationship with the tape.

(3) The carrier signal is applied to each of the recording elements so as to cause it to impress a signal on the tape 17.

(4) The signal pickup element 19 is applied in operative relation to the signal bits along track 18, while being held in a fixed relationship to the recording transducers 22—26.

(5) The output signals generated in pickup 19 are demodulated to obtain a signal that is proportional to the speed of the record medium, i.e., tape 17.

(6) Finally, the carrier signal that is being applied to each transducer, is modulated in accordance with the demodulated signal from pickup 19, so as to cause the frequency of the carrier signal to be varied directly in proportion to the speed of the tape as it travels past transducer 22.

In this manner, the carrier signal as it is physically impressed upon the record medium, will be recorded with a constant spacing between successive cycles thereof. Thus, a record will be made which has had the effects of any speed changes during recording, entirely compensated for and in effect removed from the recorded data.

Another step which may be included as part of a method according to this invention, is that of modulating the carrier signal in accordance with the information to be recorded. This step is carried out in addition to the modulating of the carrier signal by the output from the demodulator that is connected to pickup 19. The overall effect is merely a compound one, but one such that unwanted signals due to changes in speed of the drum 11 during recording will be effectively removed.

The remainder of the operation of the system involves a playback operation, i.e. where data which has been recorded is to be taken off of the magnetic tape 17. In such an operation, changes in speed which may occur during this second drive of the tape 17 past the transducers 22—26, will be compensated for in a manner which employs the signals from pickup 19 again. Thus, during a playback, the switches 40 and 41 are changed to the opposite positions from those illustrated in the drawing and the signals from pickup 19 will again be demodulated by demodulator 50. Then these signals from pickup 19 will be transmitted over the circuit paths including paths 52, 53, switch 40, terminal 42, and path 59 to the inverter 60. Then the output of inverter 60 is fed to an output of the demodulator 57 so as to be applied in opposition to the output signals from demodulator 57. Consequently, signals that are being generated at transducer 22 are now being carried via circuit path 47, switch 41 and terminal 43 to the input of demodulator 57. Then these signals, as demodulated and combined with the output of inverter 60, are carried over the circuit path 58 to be used as desired (in an indicator, or utilization circuit, or the like). With this arrangement, any signals that are being created by reason of speed changes of the drum 11 during playback operations, will be removed by cancellation thereof. This is so because speed proportional signals are being simultaneously generated in pickup 19 and in transducers 22—26, but are applied in opposition for use in cancelling one another, for each of the channels of tape 17.

It is pointed out that particularly in seismic operations, after a record has been made on the record medium (such as magnetic tape 17) playback often involves adjustment of the relative time positions of the various transducer pickups 22—26. Such adjustments are made by physically sliding the transducers around the periphery of the drum 11, as indicated in Fig. 2. These adjustments are made to compensate for the differences in weathering layer thickness, and velocity, at each of the geophone (or detector) stations that were employed when the record on tape 17 was made. By reason of these adjustments of the time positions for transducers 22—26, there are introduced differences in the phase positions from one trace to the next across the record on the tape 17. Such phase does not have any harmful effects with respect to correcting for speed variations during the playback operation, since the speed change signals that are then involved (during playback only) are introduced simultaneously in any one of the transducers and in the pickup head 19, even though the information signals are being read out at different times on the record. However, such would not be the case with regard to speed change signals that would have been introduced during the recording of the data on tape 17 without the speed change compensation according to this invention. This is so because the relative positions of transducers 22—26 have been shifted after the record was impressed. Consequently, the arrangement described above (whereby speed change signals were effectively removed during the recording procedure) is such that the change of time (or phase) positions of the transducers may be made when playback is carried out, without introducing any uncompensated speed change signals.

While there has been described in considerable detail, certain embodiments of the invention in accordance with the applicable statutes, this is not to be taken as in any way limiting the invention but merely as being descriptive thereof.

It is claimed:

1. In a recording system wherein a carrier signal is frequency modulated in accordance with information to be recorded on a record medium, the method of compensating for variations in speed of the record medium, comprising pre-setting a plurality of means for generating signal bits equally spaced apart from beginning to end and fixed relative to said record medium, driving said record medium past a recording element while in record making relation therewith, applying said carrier signal to said recording element, applying a detector to said means for generating signal bits while maintaining a fixed position relative to said recording element, demodulating the output from said detector to obtain a signal proportional to the speed of said record medium past said recording element, and modulating said carrier signal in accordance with said demodulated detector signal in order to vary the frequency of said carrier directly in proportion to the speed of said record medium so that the carrier signal will be recorded with a constant spacing between successive cycles thereof.

2. In a recording system wherein a carrier signal is frequency modulated in accordance with information to be recorded on a record medium, the method of compensating for variations in speed of the record medium, comprising pre-setting a plurality of means for generating signal bits equally spaced apart from beginning to end and fixed relative to said record medium, driving said record medium past a recording element while in record making relation therewith, applying said carrier signal to said recording element, applying a detector to said means for generating signal bits while maintaining a fixed position relative to said recording element, demodulating the output from said detector to obtain a signal proportional to the speed of said record medium past said recording element, modulating said carrier signal in accordance with said demodulated detector signal in order to vary the frequency of said carrier directly in proportion to the speed of said record medium so that the carrier signal will be recorded with a constant spacing between successive cycles thereof, and modulating said carrier signal in accordance with said information to be recorded, all whereby any changes in speed of the record medium are instantaneously compensated for so that the information is recorded as if the speed had been constant.

3. In a magnetic recording system wherein a relatively high frequency carrier signal is frequency modulated in accordance with information to be recorded on a paramagnetic medium, the method of compensating for variations in speed of the paramagnetic medium, comprising pre-setting a plurality of means for generating signal bits equally spaced apart from beginning to end and fixed relative to said medium, translating said paramagnetic medium relatively past a magnetic recording head while in operative magnetic relation therewith, applying said carrier signal to said recording head, applying a detector to said means for generating signal bits to obtain an output therefrom while maintaining said detector fixed relative to said recording head, demodulating the output from said detector to obtain a signal proportional to the speed of said paramagnetic medium past said recording head, and modulating said carrier signal in accordance with said demodulation speed signal so that said carrier signal frequency is varied directly in proportion to the speed of the paramagnetic medium and the effective recorded frequency of the carrier, when not information modulated, is held constant.

4. In a recording and reproducing system for a plurality of information channels wherein said information channels may be shifted in time relative to one another upon reproduction thereof and wherein said information channels each employs frequency modulation of a carrier signal, means for compensating for any change in speed of the record medium during the recording, comprising a signal generating pickup, a plurality of equally spaced means fixed relative to said record medium for generating signal bits in conjunction with said signal generating pickup, a plurality of recording heads, one for each of said information channels, means for translating said record medium relative to said recording heads and said pickup to record the information on said channels over a predetermined length of record, means for demodulating the output of said signal generating pickup, means for modulating said carrier signal in accordance with the demodulated output of said pickup, whereby said carrier signal is varied in frequency in proportion to the change in speed of said translating means so that the changes in frequency of said carrier signal which would have existed on the record are compensated for and removed as the record is made.

5. In a recording and reproducing system for a plurality of information channels wherein said information channels may be shifted in time relative to one another upon reproduction thereof and wherein said information channels each employs frequency modulation of a carrier signal, means for compensating for any change in speed of the record medium during the recording, comprising a plurality of equally spaced means fixed relative to said record medium for generating signal bits in conjunction with a signal generating pickup, a plurality of recording heads, one for each of said information channels, means for translating said record medium relative to said recording heads and said pickup to record the information on said channels over a predetermined length of record, means for demodulating the output of said signal generating pickup, means for modulating said carrier signal in accordance with the demodulated output of said pickup, whereby said carrier signal is varied in frequency in proportion to the change in speed of said translating means so that the changes in frequency of said carrier signal which would have existed on the record are compensated for and removed as the record is made, and means for compensating for any change in speed of the record medium during the reproduction, comprising an inverter for reversing the phase of signals therethrough, circuit means for connecting the output of said demodulating means to said inverter, means for reproducing the recorded information from said channels including demodulation means connected to said recording heads, and circuit means for connecting the output of said inverter to said last named demodulation means in order to cancel out the effect of any speed change during reproduction.

6. In a magnetic recording and reproducing system for a plurality of information channels wherein said information channels may be shifted in time relative to one another upon reproduction thereof and wherein said information channels each employs frequency modulation of a carrier signal, means for compensating for any change in speed of the magnetic record medium during the recording, comprising a signal generating pickup, a plurality of equally spaced means fixed relative to said magnetic record medium for generating signal bits in conjunction with said signal generating pickup, a plurality of magnetic recording heads, one for each of said information channels, means for translating said magnetic record medium relative to said magnetic recording head and said pickup to record the information on said channels over a predetermined length of record, means for demodulating the output of said signal generating pickup, means for modulating said carrier signal in accordance with the demodulated output of said pickup, whereby said carrier signal is varied in frequency in proportion to the change in speed of said translating means so that the changes in frequency of said carrier signal which would have existed on the record are compensated for and removed as the record is made.

7. In a magnetic recording and reproducing system which employs magnetic tape for a plurality of information channels wherein said information channels may be shifted in time relative to one another upon reproduction thereof and wherein said information channels each employs frequency modulation of a carrier signal, means for compensating for any change in speed of the tape during the recording, comprising a signal generating pickup, a plurality of equally spaced means fixed relative to said tape for generating signal bits in conjunction with said signal generating pickup, a plurality of magnetic recording heads, one for each of said information channels, means for translating said tape relative to said recording heads and said pickup to record the information on said channels over a predetermined length of tape, means for demodulating the output of said signal generating pickup, means for modulating said carrier signals in accordance with the demodulated output of said pickup, whereby said carrier signal is varied in frequency in proportion to the change in speed of said tape so that the changes in frequency of said carrier signal which would have existed on the record are compensated for and removed as the record is made.

8. In a magnetic recording and reproducing system for a plurality of information channels wherein said information channels may be shifted in time relative to one another upon reproduction thereof and wherein said information channels each employs frequency modulation of a carrier signal, means for compensating for any change in speed of the magnetic record medium during the recording, comprising a plurality of equally spaced means fixed relative to said magnetic record medium for generating signal bits in conjunction with a signal generating pickup, a plurality of magnetic recording heads, one for each of said information channels, means for translating said magnetic record medium relative to said magnetic recording heads and said pickup to record the information on said channels over a predetermined length of record, means for demodulating the output of said signal generating pickup, means for modulating said carrier signal in accordance with the demodulated output of said pickup, whereby said carrier signal is varied in frequency in proportion to the change in speed of said translating means so that the changes in frequency of said carrier signal which would have existed on the record are compensated for and removed as the record is made, and means for compensating for any change in speed of the magnetic record medium during the reproduction, comprising an inverter for reversing the phase of signals therethrough, circuit means for connecting the output of said demodulating means to said inverter, means for reproducing the recorded information from said channels including demodulation means connected to said magnetic recording heads, and circuit means for connecting the output of said inverter to said last named demodulation means in order to cancel out the effect of any speed change during reproduction.

9. In a magnetic recording and reproducing system that employs magnetic tape for a plurality of information channels wherein said information channels may be shifted in time relative to one another upon reproduction thereof and wherein said information channels each employs frequency modulation of a carrier signal, means for compensating for any change in speed of the magnetic tape during the recording, comprising a plurality of equally spaced means fixed relative to said tape for generating signal bits in conjunction with a signal generating pickup, a plurality of magnetic recording heads, one for each of said information channels, means for translating said magnetic tape relative to said recording heads and said pickup to record the information on said channels over a predetermined length of record, means for demodulating the output of said signal generating pickup, means for modulating said carrier signals in accordance with the demodulated output of said pickup, whereby said carrier signal is varied in frequency in proportion to a change in speed of said translating means so that the changes in frequency of said carrier signal which would have existed on the record are compensated for and removed as the record is made, and means for compensating for any change in speed of the tape during the reproduction, comprising an inverter for reversing the phase of signals therethrough, circuit means for connecting the output of said demodulating means to said inverter, means for reproducing the recorded information from said channels including demodulation means connected to said magnetic recording heads, and circuit means for connecting the output of said inverter to said last named demodulation means in order to cancel out the effect of any speed change during reproduction.

References Cited in the file of this patent

UNITED STATES PATENTS 2,668,283 Mullin ---------- Feb. 2, 1954
2,685,079 Hoeppner ---------- July 27, 1954